United States Patent
Vlot et al.

(10) Patent No.: US 9,722,992 B2
(45) Date of Patent: Aug. 1, 2017

(54) SECURE INSTALLATION OF SOFTWARE IN A DEVICE FOR ACCESSING PROTECTED CONTENT

(71) Applicant: Vodafone GmbH, Düsseldorf (DE)

(72) Inventors: Marnix Vlot, Düsseldorf (DE); Christoph Schaaf, Düsseldorf (DE)

(73) Assignee: Vodafone GmbH (DE)

( * ) Notice: Subject to any disclaimer, the term of this patent is extended or adjusted under 35 U.S.C. 154(b) by 52 days.

(21) Appl. No.: 14/788,418

(22) Filed: Jun. 30, 2015

(65) Prior Publication Data

US 2016/0006724 A1 Jan. 7, 2016

(30) Foreign Application Priority Data

Jul. 4, 2014 (EP) ..................................... 14175749

(51) Int. Cl.
*G06F 21/10* (2013.01)
*H04L 29/06* (2006.01)
(Continued)

(52) U.S. Cl.
CPC .......... *H04L 63/0823* (2013.01); *G06F 21/10* (2013.01); *G06F 21/57* (2013.01);
(Continued)

(58) Field of Classification Search
CPC . H04L 63/0823; H04L 63/062; H04L 63/061; H04L 63/0442; H04L 63/12;
(Continued)

(56) References Cited

U.S. PATENT DOCUMENTS

| 6,233,565 B1* | 5/2001 | Lewis | .................... | G06Q 20/00 705/26.1 |
| 2002/0136407 A1* | 9/2002 | Denning | ................. | G06F 21/10 380/258 |

(Continued)

OTHER PUBLICATIONS

Embedded Common Interface (ECI) for exchangeable CA/DRM solutions; Part 1: Architecture, Definitions and Overview, ETSI Indestry Specification Group (http://www.etsi.org/deliver/etsi_gs/ECI/001_099/00101/01.01.01_60/gs_ECI00101v010101p.pdf), Sep. 2014.*

*Primary Examiner* — Minh Dinh
*Assistant Examiner* — Mary Li
(74) *Attorney, Agent, or Firm* — Innovation Counsel LLP (57) ABSTRACT

The invention relates to a device for decrypting protected content and for providing the decrypted content for playback, the device comprising a secure module for carrying out cryptographic operations including the decryption of the protected content using decryption information, and the device being configured to install therein at least one client software module assigned to a provider of protected content, the client software module being adapted to forward decryption information for decrypting the protected content of the provider to the secure module in an encrypted form. The secure module is adapted to store therein a public key assigned to the provider and to authenticate at least one link key provided by the content provider using the stored public key. Further, the secure module is adapted to receive a protected software image of the client software module and to initiate the installation of the client software module in the device upon having decrypted and/or validated the software image by means of a link key authenticated using the registered public key or by means of a key of a key ladder derived from the authenticated link key, and, during execution of the installed client software module, the secure
(Continued)

module is adapted to decrypt the decryption information by means of a link key authenticated using the registered public key or by means of key of a key ladder derived from the authenticated link key. Moreover, the invention relates to a method for operating the device.

15 Claims, 2 Drawing Sheets (51) Int. Cl.
    *G06F 21/57*     (2013.01)
    *G06F 21/72*     (2013.01)

(52) U.S. Cl.
    CPC .......... *G06F 21/72* (2013.01); *H04L 63/0435* (2013.01); *H04L 63/0442* (2013.01); *H04L 63/061* (2013.01); *H04L 63/062* (2013.01); *H04L 63/123* (2013.01)

(58) Field of Classification Search
    CPC ... H04L 63/0435; H04L 63/123; G06F 21/72; G06F 21/10; G06F 21/57
    See application file for complete search history.

(56) References Cited

U.S. PATENT DOCUMENTS

| 2002/0184512 | A1* | 12/2002 | Cardoso, Jr. | G06F 21/572 713/193 |
| 2007/0130084 | A1* | 6/2007 | Kay | G06Q 20/3674 705/67 |
| 2008/0098212 | A1* | 4/2008 | Helms | H04L 63/0428 713/155 |
| 2008/0226079 | A1* | 9/2008 | Kim | G06F 21/10 380/277 |

* cited by examiner

SECURE INSTALLATION OF SOFTWARE IN A DEVICE FOR ACCESSING PROTECTED CONTENT

CROSS-REFERENCE TO RELATED APPLICATIONS

This application claims benefit of priority to European Patent Application No. EP14175749 filed on Jul. 4, 2014, which is incorporated herein by reference in its entirety.

DESCRIPTION

The invention relates to content protection systems, such as conditional access (CA) and/or digital rights management (DRM) systems, which employ cryptographic techniques to manage access to content transmitted to user devices. More specifically, the invention relates to a method for operating a device for decrypting protected content and for providing the decrypted content for playback and to a corresponding device.

Content protection systems are essential in the rapidly developing area of digital broadcast. In such systems, content is usually provided in a cryptographically protected form so that users have to decrypt the content before it can be played back. The cryptographic information necessary for decrypting the content is provided to authorized user devices in a secure manner to thereby only allow such user devices to access and render the protected content. Thus, content providers can control which user devices can access their content and they can also define criteria under which authorized users can access the content using their user devices.

Such user devices are configured as so-called consumer premises equipment (CPE), such as set top boxes, special TV sets or the like, which comprise the hardware and software necessary for securely decrypting the content and for securely communicating with the provider side. In conventional content protection systems, such user devices are proprietary devices which are manufactured and provisioned under the control of the content provider. While proprietary user devices ensure a high level of security, it is a drawback of such devices that they affect the flexibility for users to change to different content providers and/or use services of several content providers. So, users usually need a new or additional user device, when they change the content provider or subscribe to services of a further content provider. This is cumbersome for users and expensive for content providers as they have to provide each new user with a device for accessing their services.

Therefore, new user devices have recently been suggested, which are capable to be used in content protection systems of different content providers. So, the European Telecommunications Standards Institute (ETSI) is currently standardizing a hardware and software platform for such user devices which uses the so-called Embedded Common Interface (ECI). This platform is particularly disclosed in the white paper "ISG ECI: Industry Specification Group on Embedded Common Interface for exchangeable CA/DRM solutions" which can be retrieved under http://portal.etsi.org/ECI/ETSI %20ISG %20ECI %20White %20Paper-v1_20.pdf.

The platform includes a secure functionality for decrypting protected content in the user device. Moreover, for each content provider, a provider-specific client software is installed in the user device. This client software comprises provider-specific functions necessary for accessing the content of a certain content provider. When the user wishes to subscribe to a new content provider, the client software for the new provider has to be installed in the device.

It is an object of the present invention to allow for a secure download and installation of a provider-specific client software module in a user device for decrypting protected content.

The object is achieved by a device according to claim 1 and by a method according to claim 15. Embodiments of the device and the method are given in the dependent claims.

According to a first aspect, the invention suggests a device for decrypting protected content and for providing the decrypted content for playback. The device comprises a secure module for carrying out cryptographic operations including the decryption of the protected content using decryption information, and the device is configured to install therein at least one client software module assigned to a provider of protected content, the client software module being adapted to forward decryption information for decrypting the protected content of the provider to the secure module in an encrypted form. The secure module is adapted to store therein a public key assigned to the provider and to authenticate at least one link key provided by the content provider using the stored public key. Moreover, the secure module is adapted to receive a protected software image of the client software module and to initiate the installation of the client software module in the device upon having decrypted and/or validated the software image by means of a link key authenticated using the registered public key or by means of a key of a key ladder derived from the authenticated link key, and, during execution of the installed client software module, the secure module is adapted to decrypt the decryption information by means of a link key authenticated using the registered public key or by means of key of a key ladder derived from the authenticated link key.

According to a further aspect, the invention suggests a method for operating a device for decrypting protected content and for providing the decrypted content for playback, the device comprising a secure module for carrying out cryptographic operations including the decryption of the protected content using decryption information, and the device being configured to install therein at least one client software module assigned to a provider of protected content, the client software module being adapted to forward decryption information for decrypting the protected content of the provider to the secure module in an encrypted form. The method comprises the steps of: (i) the secure module storing a public key assigned to the provider and authenticating at least one link key provided by the content provider using the stored public key, (ii) the secure module receiving a protected software image of the client software module and initiates the installation of the client software module in the device upon having decrypted and/or validated the software image by means of a link key authenticated using the registered public key or by means of a key of a key ladder derived from the authenticated link key, and (iii) during execution of the installed client software module, the secure module decrypting the decryption information by means of a link key authenticated using the registered public key or by means of key of a key ladder derived from the authenticated link key.

Advantageously, the invention ensures that a client software module can only be installed for a provider which has been registered in the secure module on the basis of his public key. Moreover, the software image can be provided to the device in a protected form and is decrypted in the secure module of the device by means of the link key or a key of a key ladder derived from the link key. This ensures a protection of the software image and allows for an implicit authentication of the software image on the basis of the link key, as the link key has previously been authenticated using the provider's public key stored in the secured module.

The protection of the software image may particularly be achieved by encrypting the software image. In this case, the secure module decrypts the protected software image upon receipt. In addition or as an alternative, the software image may be provided with validation information, such as a digital signature or a message authentication code, which is validated in the secure module using the link key or a key of a key ladder derived from the link key.

The key ladder derived from the link key does at least include one further cryptographic key which is provided to the secure module in an encrypted form and which is decrypted using the link key. In addition, the key ladder may include further keys, where each key of the key ladder is provided in an encrypted form and is decrypted in the secure module by means of the preceding key in the key ladder.

It is a further advantage of the invention that the decryption information for decrypting the content of the provider is forwarded to the secure module in such a way that it can also be decrypted by means of a link key authenticated using the provider's public key stored in the secure module or by means of a key ladder derived from the link key. Thus, the same mechanism can be used for protecting the download and the installation of the software image of the client software module and the transmission of decryption information to the secure module. Hence, there is no need to provide an additional secure mechanism for the secure download of the software image. Hereby, the complexity of the secure module can be reduced. This leads to an improvement of the secure module's security as complexity usually affects the security.

The link key on the basis of which the decryption information is decrypted and the link key on the basis of which the software image is decrypted and/or validated may be the same. Thus, one single link key and/or a key of a key ladder derived from this link key may be used for decrypting the decryption information and for decrypting and/or validating the protected software image of the client software module. Likewise different link keys authenticated by means of the public key of the provider may be employed.

In one embodiment of the device and the method, the secure module is configured to store the public key only upon having successfully validated a digital certificate assigned to the public key. The digital certificate may particularly be validated using a so-called root digital certificate including at least a public key, which is stored in the secure module in such a way that it cannot be modified, or the digital certificate may be validated using a sequence of digital certificates including the root digital certificates and one or more intermediate digital certificates. This embodiment ensures that only trusted providers which dispose of a public key that can be successfully validated in the user device on the basis of one or more digital certificates can provide a valid link key.

In a further embodiment of the device and the method, the link key is provided with a digital signature created on the basis of a secret key assigned to the content provider, and the authentication of the link key in the secure module comprises verifying the digital signature using the public key stored in the secure module. Hereby, a reliable authentication of the link key is ensured. The digital signature may particularly comprise a digest, such as a hash value, of the link key, and the digest may be encrypted using the secret key. The secure module may verify the digital signature by decrypting the digest using the public key stored in the secure module. Moreover, the secure module may calculate the same digest and may successfully verify the digital signature if the generated digest and the decrypted digest correspond to each other.

Moreover, one embodiment of the device and the method provides that the secure module is adapted to receive the link key in an encrypted form and to store the link key upon having decrypted the link key using a secret key, the secret key being securely stored in the secure module. In a related embodiment, the link key is encrypted using a public key assigned to the secure module, the secret key and the public key assigned to the secure module forming an asymmetric key pair. These embodiments ensure a reliable protection of the link key during its transmission to the secure module.

In a further embodiment of the device and the method, the software image of the client software module is particularly decrypted using a download key, where the download key and the link key form a key ladder comprising two keys. In this embodiment, the secure module is adapted to decrypt and/or validate the software image of the client software module using a download key, the download key being provided to the secure module by the provider in an encrypted form and being decrypted in the secure module using the link key. It is one advantage of this embodiment that a link key can be used which is uniquely assigned to the device or the secure module and that this key ban be used to decrypt a download key that may be used in a plurality of user devices for decrypting and/or validating the software image. Thus, the software image does not have to be individually protected for each user device. At the same time, an individual link key can be used. This does particularly improve the security, when the link key is used during a longer period of time in connection with a plurality of transmissions of data to the secure module.

One embodiment of the device and the method provides that, when being executed in the device, the client software module receives the decryption information in an encrypted form, decrypts the decryption information and forwards the decryption information to the secure module upon having encrypted the decryption information again in such a way that it can be decrypted using the link key. It is an advantage of this embodiment, that the provider does not have to transmit the decryption information to the device in such a way that they can be decrypted using the link key. Rather, the provider may encrypt the decryption information in another way. Upon receipt in the user device, the client software module than re-encrypts the decryption information in such a way that the secure module can decrypt the decryption information using the link key. An alternative embodiment provides that, when being executed in the device, the client software module receives the decryption information in an encrypted form, the encryption being made in such a way that the decryption information can be decrypted using the link key, and to the client software module forwards the encrypted decrypted information to the secure module.

Moreover, in one embodiment of the device and the method, the secure module comprises a plurality of slots for storing one or more cryptographic keys and/or carrying out cryptographic operations using the stored cryptographic keys, and wherein the secure module is configured to store the public key in one slot. In a related embodiment, the secure module reserves the slot for the content provider to which the public key is assigned in response to the storing of the public key in the slot. Each slot may comprise resources of the secure module, such as registers and/or memory, for storing data and executing cryptographic operations for a certain provider only. By providing different slots for storing cryptographic keys and executing cryptographic operations for different providers, interferences between the operations carried out for different providers can be prevented. Hereby, the security can be further improved.

In accordance with a further embodiment of the device and the method, the device has at least one mode of operation in which a client software module can only be installed and/or executed in the device when the software image of the client software module has been decrypted and/or validated by means of a link key authenticated using the registered public key or by means of a key contained in a key ladder derived from the authenticated link key. This embodiment ensures that a client software module executed in the device has been installed therein on the basis of the secure mechanism involving the public key of the provider stored in the secure module, when the corresponding mode of operation has been selected. Hereby, the installation of fraudulent client software modules can be prevented.

In addition to the device, the invention provides a system comprising a device according to the invention or one of its embodiments and further comprising a provider server configured to send the public key and/or the link key to the device. In one embodiment of the system, the provider server is further configured to transmit the software image of the client software module and/or the decryption information to the device.

The aforementioned and other aspects of the invention will also be apparent from and elucidated with reference to the embodiments described hereinafter making reference to the drawings in which.

Figure 1:
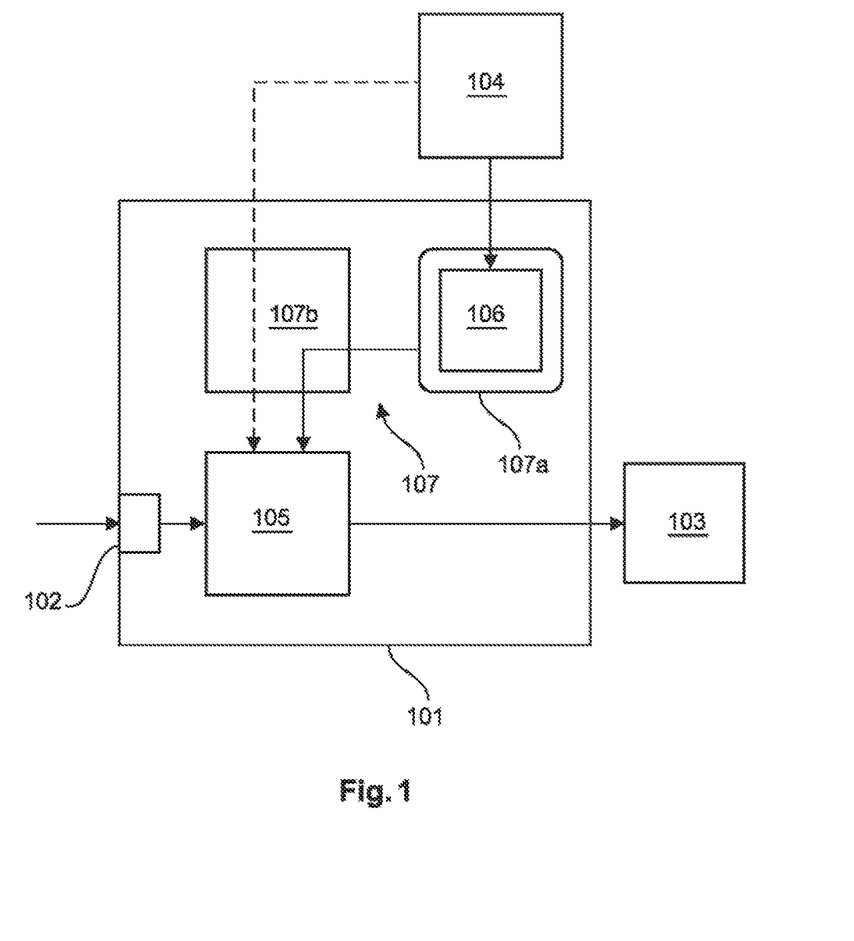
FIG. 1 is a schematic depiction of components of a system for providing protected content including a device according to the invention.

FIG. 1 shows a system for providing protected content to user devices which may configured as a set top box, a special hardware module within a TV set or another CPE. By way of example, a single user device 101 is depicted in FIG. 1 and described hereinafter. However, the system may typically comprise a plurality of similar user devices 101 for receiving protected content distributed within the system.

The protected content may include audio and/or video programs, such as television programs, movies, pieces of music and the like. It may be transmitted to the user device 101 via a broadcast transmission channel, which may include a satellite broadcast channel, a cable broadcast channel and/or a terrestrial radio broadcast channel. In the case of a transmission of the protected content via a broadcast transmission channel, the same content is usually simultaneously transmitted to a plurality of user devices 101. In addition or as an alternative, the protected content may also be transmitted to the user device 101 individually upon on a corresponding request of the user device 101. In this case, the protected content may e.g. be downloaded to the user device via an Internet Protocol (IP)-based data network.

The user device 101 is capable of receiving the protected content via a suitable reception interface 102, of accessing (i.e. decrypting) the protected content and of forwarding the protected content to a suitable playback device 103. The playback device 103 may be a physically separated device connected to the user device 101, or the user device 101 and the playback device 103 may be components of an integrated apparatus. In particular, the playback device 101 may comprise a display unit which is integrated into the user device 101 or connected to the user device 101.

The protected content is transmitted to the user device 101 in an encrypted and/or scrambled form (both is commonly referred to as encryption herein). The user device 101 descrambles or decrypts (commonly referred to as decrypting herein) the protected content, if the user operating the user device 101 is authorized to access the protected content. After the decryption is made, the user device 101 forwards the decrypted content to the playback device 103. Encryption of the protected content is made by the content provider on the basis of a suitable encryption algorithm using a secret key. For decrypting the content, the user device 101 uses a corresponding decryption key which is also referred to as control word herein. In principle, any encryption and decryption scheme known to a person skilled in the art may be used to encrypt the content at the provider side and decrypt the content in the user device 101. One example of a suitable encryption and decryption scheme is the ISO MPEG Common Encryption standard.

In one embodiment, the control word is specified in a message transmitted to the user device 101 by a provider server 104 operated by the content provider. The message may be transmitted together with the protected content through the same transmission channel as a so-called Entitlement Control Message (ECM). In alternative embodiments, the control word may be specified in a message transmitted to the user device 101 via a different transmission channel. In case of a broadcast transmission of the protected content to a plurality of users, all users may decrypt the content using the same control word. In order to prevent the control word from being discovered and used by unauthorized users, the control word may only be valid during a limited period of time, which is also referred to as cryptoperiod hereinafter. The cryptoperiod may have a length between several seconds and one or several minutes, for example. After the cryptoperiod for one control word is expired, the provider encrypts the content using a new key, and transmits a message specifying the new control word which is used for decrypting the content within the user devices 101 for the next cryptoperiod. Particularly if the protected content is transmitted to the user device 101 individually upon request, the control word may be specific to content and/or the user. In this case, a change of control words may be dispensed with.

The user device 101 comprises a secure module 105 for carrying out cryptographic operations. Such cryptographic operations include the decryption of the protected content received in the user device 101. Thus, protected content received via the reception interface 102 is forwarded to the secure module 105 within the user device 101, and the secure module 105 decrypts the protected content using the control word assigned to the content. Then, the decrypted content is forwarded to the playback device 103 which out puts the content to the user of the user device 101.

In one embodiment, the secure module 105 is configured as a separate, secured hardware block that includes a processor and memory for securely executing cryptographic operations and storing data used for carrying out these operations. The operations may be implemented in the secure module 105 by means of a program code which is securely stored in the memory in such a way that they cannot be read or modified from outside the secure module 105. The hardware block forming the secure module 105 provides a secure hardware environment for the processor and the memory which protects data being stored in the memory and used in the cryptographic operations from being modified and/or read and which protects operations executed by the processor from being manipulated and/or uncovered from outside the secure module 105. In a further embodiment, the secure module 105 may be configured as a software module which is executed in a further processor of the user device 101, which also provides other functions than the execution of cryptographic operations.

The cryptographic operations executed in the secure module 105 comprise the encryption and decryption of data using respective encryption and decryption keys, and the calculation of digests of data, such as hash values, in order to verify digital signatures. Moreover, the secure module 105 is preferably capable of verifying the authenticity of public cryptographic key using one or more digital certificates stored in the secure module 101. Such digital certificates include a so-called root digital certificate which may be stored in the secure module 105 in such a way that it cannot be modified. Using the root digital certificate and possible further intermediate digital certificates, the secure module 105 can verify the authenticity of public keys using digital certificates assigned to such keys in a way known to a person skilled in the art. In particular, a digital certificate for a public key may include an encrypted digest of the public key, and the encrypted digest may be created using a secret key pertaining to the root digital certificate or a further digital certificate in a so-called chain of trust including the root digital certificate and one or more intermediate digital certificates. Thus, the public key included in the root digital certificate or a further digital certificate of a chain of trust can be used to decrypt the encrypted digest in order to validate the public cryptographic key.

Digital certificates for public keys provided to the secure module 105 may particularly be issued by a trust authority which manages the user devices 101 used in the system and which disposes of the secret key pertaining to the root digital certificate and/or to one or more further digital certificates of the chain of trust for verifying the digital certificates for the public keys. The trust authority may particularly issue digital certificates for trusted content providers which are allowed to install software in the user devices 101 in the process explained below. Such a trusted provider may dispose of a secret key and a public key of an asymmetric key pair assigned to the provider. For the public key, the trust authority my issue a digital certificate which can be verified in the secure module 105 of the user device 101 using the digital root certificate and possibly further intermediate digital certificates stored in the secure module 105.

For establishing a secure data exchange with the secure module 105 an asymmetric key pair including a public and a secret key is preferably uniquely assigned to the secure module 105. The secret key of the key pair is securely stored in the secure module 105 in such a way that it cannot be modified and/or read from the outside of the secure module 105. The public key can be provided to entities and organizations in order to allow them to communicate with the secure module 105. An entity or organization disposing of the public key of the secure module 105 can particularly generate encrypted messages using the public key which can only be decrypted in the secure module 105 using the secret key. As will be explained in more detail below, the public key is particularly provided to a content provider that wants to install software in the user device 101 in order to allow the content provider to send messages to the secure module 105 in the process of downloading the software to the user device 101.

The secure module 105 interacts with further software executed in the user device 101. If the secure module 105 is configured as a separate hardware block of the user device 101, the further software is executed outside the secure module 105 in further processor of the user device 101 (i.e. a processor different from that included in the secure module 105), and the program code of such further software is stored outside the secure module 105 in a further memory of user device 101.

In particular, the further software provides functionality for accessing the content of one or more content providers, which is required for this purpose in addition to the cryptographic operations carried out the secure module 105. In order to provide such functionality, the further software of the user device 101 particularly comprises one or more client software modules 106. Each client software module 106 is assigned to one of the providers of content which is accessed by means of the user device 101 and is configured to execute provider-specific functions in the user device 101. In particular, a client software module 106 assigned to a content provider is configured to communicate with the provider server 104 of the respective content provider. For this purpose the client software module 106 is configured to receive and process messages of the provider server 104 in accordance with the communication protocols used by the content provider. The communication between the provider server 104 of a content provider and the client software module 106 assigned to the content provider is cryptographically secured. For this purpose, a client software module may particularly include a secret cryptographic key, and the provider server 104 may encrypt message sent to the client software module in such a way that they can only be decrypted using the secret cryptographic key. The secret cryptographic key may be uniquely assigned to a particular client software module 106, or it may be commonly used by client software modules 106 installed in different user devices 101.

In particular, the client software modules 106 are configured to receive the messages of the content provider specifying the control words for accessing the content of the provider. In the processing of such a message, the client software module 106 reads the control word from the message received from the provider server 104 and forwards the control word to the secure module 105 so that the secure module 105 can use the control word to decrypt the content of content provider. Moreover, a client software module 106 may be configured to receive and process further messages sent by the provider server 104. For instance, it may receive control messages of the content provider which control access rights of the user device 101 to access content of the provider and may enforce such access rights within the user device 101. Using such messages, the content provider may e.g. define which content can be accessed by the user device 101 and potentially further requirements for accessing such content. Such further requirements may include restrictions to access the content to certain times (e.g. certain times of a day and/or days of the week) or requirements to make a payment in order to access certain content.

When being executed in the user device 101, the client software modules 106 are preferably embedded into a system or host software 107, which provides common functions and services which can be accessed by all client software modules 106 installed in the user device 101. For the execution of each client software module 106, the host software 107 may include a container 107a which forms a secure software environment for executing the assigned client software modules 107a. The container 107a insulates the included client software module 106 from further programs executed in the user device 101 in order to enhance protection of the client software module 106 against unauthorized access to sensitive data processed therein. Moreover, the container 107a provides to the included client software module 106 interfaces for forwarding data received from a provider server 104 to the client software module 106 assigned to the provider and for transmitting messages generated by a client software module 106 of a provider to the assigned provider server 104. A further interface is provided which allows the client software module 106 to communicate with the secure module 105.

In addition, the host software 107 may comprise further program modules 107b implementing common functionality for controlling the data exchange within the user device 101 and with external entities and which may provide further common functionality which can be accessed by the installed client software modules 106.

The communication between the client software modules 106 installed in the user device 101 and the secure module 105 of the user device 101 is cryptographically protected in order to prevent data sent from the clients software modules 106 to the secure module 105 from being uncovered. Hereby, it can particularly be prevented that control words can be discovered while travelling from the client software module 106 to the secure module 105 within the user device 101. So, as will be explained in more detail below, the client software module 106 does particularly transmit the control word to the secure module 105 in an encrypted form, and the secure module 105 decrypts the control word in order to use the control word to decrypt content of the provider. Without such protection, the code word could be read while being transmitted from the client software module 106 to the secure module 105 within the user device 101 and could be used for decrypting the provider's content using further (unauthorized) user devices 101 without permission.

In one embodiment, the secure module 105 comprises a number of slots which can be assigned to content providers and which are linked with the software containers 107a executed in the user device 101. In particular, each software container 107a may be permanently linked to an assigned slot of the secure module 105. A slot particularly includes resources of the secure module 105, which are reserved for this slot and cannot be used by other slots. Such resources may include memory and registers. Moreover, a slot provides access to the operations carried out in the secure module for the client software module 106 executed in the assigned container 107a (e.g. through an allocated address for accessing functions of the secure module 105).

As said above, the user device 101 comprises one client software module 106 for each provider the content of which is access using the user device 101. Thus, the user device 101 does usually include at least one client software module 106. However, in order to access content of several providers, the user device 101 may likewise include a plurality of client software modules 106. In order to access content of a new provider and/or to change the content provider while the user device 101 is operated at a user's site, the user device 101 allows to install client software modules 106 from a remote location and to delete client software modules 106 installed in the user device 101.

For installing a new client software module 106 in the user device 101, the program code of the client software module 106—which is herein also referred to as software image of a client software module 106—is downloaded to the user device 101 in a secure process which will be described in more detail herein below. As will be appreciated from the following description, this process relies on functions of the secure module 105 which is also utilized when decrypting content of a content provider. In that far, it is not necessary to implement in the secure module 105 further functionality especially for downloading and installing software images of client software modules 105.

In order to download and install a client software module 106, the user device 101 may be operated in a special bootstrap mode. The bootstrap mode particularly differs from the normal mode of operation of the user device 101 in that it allows a provider server 104 to directly communicate with the secure module 105 of the user device 101 (see dashed connection line in FIG. 1). Thus, while in the normal operation mode messages are exchanged between a provider server 104 and the client software module 106 assigned to the same provider, the bootstrap mode makes it possible to forward messages from the provider server 104 directly to the secure module 105 within the user device 101.

The functionality for forwarding messages to the secure module 105 within the user device 101 may be provided by the host software 107. In a further embodiment, this functionality may be provided by software originating from the content provider, which is installed in the user device 101 and which is also referred to as boot client module hereinafter. The program code of boot client module may be transmitted from the provider server 104 to the user device 101 and installed in the user device 101, before the client software module 106 is downloaded to and installed in the user device 101. By means of a boot client module it is particularly possible to use provider-specific communication protocols in the communication between the provider server 104 and the user device 101. Unlike the client software module 101, the boot client module may be installed in a software installation process which may not involve the secure module 105. Functionality for carrying out this installation process may be provided by the host software 107. In particular, the provider server 104 may sent the program code of the boot client module to the user device 101 together with an instruction to install the boot client module. This instruction is recognized by the host software 101 which then controls the installation process.

Figure 2:
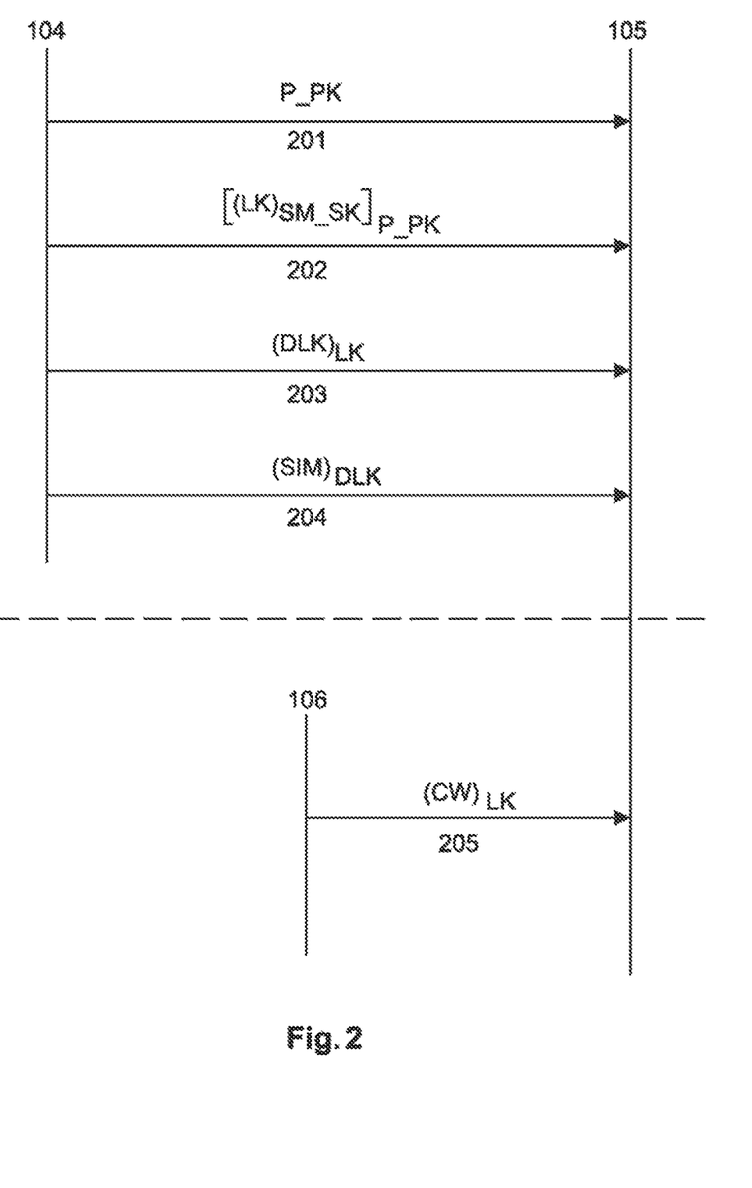
FIG. 2 is a schematic illustration of steps for downloading a software image of a client software module to the user device.

In the following, the process for securely downloading and installing the software image of a client software module 106 will be explained making reference to FIG. 2. In FIG. 2, encryption of data is indicated by means of parentheses, and a subscript indicates the key for decrypting the data.

Thus the expression $(D)_x$ denotes that data D is encrypted in such a way that it can be decrypted using the key x. Moreover, square brackets indicate that data is provided along with a digital signature, and a subscript specifies the key that can be used for verifying the digital signature. Thus, the expression $[D]_x$ refers to data D provided with a digital signature that can be validated using the key x.

When a content provider wishes to install a client software module 106 in the user device 101, the provider has to be authenticated in the secure module 106 at first. For this purpose, the provider server 104 of the content provider preferably transmits the provider's public key P_PK to the secure module 105 in step 201. Upon receipt of the public key P_PK, the secure module 105 verifies that the provider has been approved by the trust authority. For this purpose, the public key P_PK may be included in or accompanied by an assigned digital certificate which is validated in the secure module 105 as explained above. If the digital certificate of the provider can not be successfully validated, the secure module 105 blocks the execution of further steps for installing the client software module 106. Hereby, it is ensured that only trusted content providers can install a client software module 106 in the user device 101.

Upon a successful validation of the digital certificate of the content provider the secure module 105 stores the public key P_PK of the content provider for future use. In particular, the secure module 105 may store the public key in a slot assigned to the provider. The slot is preferably reserved for the provider upon the successful authentication of the content provider on the basis of the public key P_PK. As explained above, there may also be a container 107a of the system software that is allocated to the slot assigned to the provider. In this container, the client software module of the content provider will be executed after it has been installed in the user device 101.

Using the stored public key P_PK, the secure module 105 can authenticate further data transmitted to the user device 101, which originates from the content provider. In particular, such data may be provided with a digital signature that the content provider creates using the secret key pertaining to the public key P_PK. In particular, the provider may add a digital signature to such data which is created using the provider's secret key. In order to authenticate the data, the secure module 105 may verify the digital signature using the stored public key P_PK of the provider. Moreover, the provider can use the public key of the secure module 105 in order to encrypt data transmitted to the user device. Such data can be decrypted in the secure module 105 using the secret key SM_SK of the secure module 105 stored therein. The encrypted data may additionally be provided with a digital signature created using the provider's secret key. Thus, it possible to send to the secure module 105 encrypted (i.e. protected) data, which can be decrypted and authenticated in the secure module 105.

Using these protections mechanisms, the provider may transmit the software image of the client software module 106 to the user device 101. For example, the provider could encrypt the software image using the public key of the secure module 105 and add a digital signature created using the provider's secret key. The secure module 105 could decrypt the software image using the secret key SM_SK stored in the secure module 105 and could authenticate the software image by verifying the digital signature using the public key P_PK of the provider stored in the secure module 105. However, this mechanism is relatively complex and requires that the provider transmits the software image with an encryption and a digital signature which are individually created for the user device 101 or the secure module 101. This would require an individual processing of the software images for each user device 101.

Particularly in order to facilitate the provision of the software images to a plurality of user devices 101, the provider does not use the aforementioned mechanism to transmit the software image of the client software module 106. Rather, the software image is protected such that it can be decrypted and/or validated in the secure module 105 using a link key LK or a key ladder derived from the link key LK. Such a key ladder includes the link key LK and at least one further key, which is transmitted to the secure module 105 in an encrypted form and decrypted in the secure module 105 using the link key LK. In addition, the key ladder may include further keys, where each key is transmitted to the secure module 105 in an encrypted form and which is decrypted using the preceding key of the key ladder.

Thus, after having sent the provider's public key P_PK in step 201, the provider server 104 may sent a link LK to the secure module 105. The link key may be generated in the provider server 104. It is used in the further communication with the secure module which includes the transmission of encrypted data which are decrypted in the secure module 105 using the link key LK. Such data are encrypted using an encryption key pertaining to the link key LK. In one implementation, the link key LK may be a symmetric key. This means that the encryption key corresponds to the link key LK. In a further implementation, the link key LK and the encryption key form an asymmetric key pair.

In one implementation, the link key LK is uniquely assigned to the secure module 105 or the user device 101 including the secure module. Thus, the provider does not use the same link key LK in connection with another user device 101. However, in further implementations it is likewise possible to use one link key LK for several user devices 101. In order to prevent unauthorized third parties from uncovering encrypted data which can be decrypted using the link key LK, the link key LK is kept secret. Moreover, as will be apparent from the following description, the secure module 105 will regard further encrypted data that can be decrypted using the link key LK as valid data originating from the content provider. In order to ensure that such data cannot be sent by third parties, also the encryption key pertaining to the link key LK is preferably kept secret (in case both keys are different).

For transmitting the link key LK to the secure module 105, the provider server 104 generates a link key message which includes the link key LK in an encrypted form. The encryption is made using the public key of the secure module 105. In addition, the provider server 104 provides the link key message with a digital signature which is generated using the secret key of the provider which pertains to the public key P_PK certified by the trust authority. The digital signature may include a digest of at least part of the message's content which is encrypting using the aforementioned secret key of the content provider. Upon having generated the link key message, the provider server 104 sends the link key message to the user device 101 in step 202.

Upon receipt of the link key message in the user device 101, it is forwarded to the secure module 105 by the corresponding function of the host software 107 or by the boot client module. Then, the secure module 105 verifies the digital signature included in the link key message using the public key P_PK of the content provider which has been previously installed in the secure module 105. For this purpose, the secure module 105 may decrypt the encrypted digest included in the digital signature using the provider's public key P_PK. Further, the secure module 105 may compare the decrypted digest with a corresponding digest generated in the secure module 105. Only if it is possible for the secure module 105 to decrypt the digital signature using the provider's public key P_PK and only if the decrypted digest and the digest generated in the secure module 105 correspond to each other, the secure module 105 determines that the digital signature is valid. The first condition (i.e. the ability to decrypt the digital signature using the previously stored public key P_PK of the provider) ensures that only a provider server 104 for which a slot is reserved in the secure module 105 in a preceding step can transmit a valid link key LK to the secure module 105 and thereafter install its client software module 106 in the user device 101. The second condition (i.e. the match of the digests) ensures the integrity of the link key message.

Upon having successfully verified the digital signature included in the link key message, the secure module 105 decrypts the encrypted link key LK included in the message using its secret key SM_SK. Then, the secure module 105 stores the link key LK. In particular, the link key LK may be stored in the slot assigned to the provider.

In one embodiment, the provider server 104 further sends to the secure module 105 a download key DLK which is protected by means of the link key LK and which will later be used by the secure module 105 to decrypt an encrypted software image SIM of the client software module 106 of the provider. Thus, the download key DLK and the link key LK form a key ladder (with two keys), which is derived from the link key LK. The download key DLK may be generated in the provider server 104 and is preferably configured as a symmetric key. In order to transmit the download key DLK to the secure module 105, the provider server 104 generates a download key message which includes the download key DLK in an encrypted form. The encryption is made in such a way that the download key DLK can be decrypted in the secure module 105 using the link key LK. Thus, the provider server 104 encrypts the download key DLK using the encryption key pertaining to the link key LK. Upon generation of the message, the provider server transmits the download key message to the user device 101 in step 203.

Upon receipt of the download key message in the user device 101, the corresponding function of the host software 107 or the boot client module forwards the message to the secure module 105. Then, the secure module 105 decrypts the download key DLK by means of the link key LK and stores the download key DLK in the slot assigned to the content provider.

In the next step, the provider server 104 can send the software image SIM of the provider's client software module 106 to the user device 101. The software image is transmitted in protected form. In one embodiment, the software image is protected by encrypting the software image. In this case, the encryption is made such that decryption can be carried out using the download key DLK. Thus, the software image DLK is encrypted using the download key (in case of a symmetric download key). In addition or as an alternative, validation information may be added to the software image, which can be validated by means of the download key in order to verify the integrity of the software image. For instance, such validation information may comprise a message authentication code created using the data content of the software image and the download key, or the validation information may include a digital signature comprising a digest of the software image which is encrypted such that it can be decrypted using the download key. In case the software is both encrypted and provided with validation information, the download key DLK may be used for encrypting and for creating the validation information so that the download key DLK can be used for decrypting the software image and for verifying the validation information. One example algorithm that allows for combining the encryption and the creation of validation information and that can be applied here is known as AES-XCBC-MAC-96 Algorithm (see http://www.ietf.org/rfc/rfc3566.txt).

The software image, which is protected in accordance with one of the aforementioned embodiments, is transmitted from the provider server 104 to the user device 101 and forwarded to the secure module 105 within the user device 101 in step 204. In alternative embodiments, the protected software image is not sent to the user device 101 by the provider server 104, but the provider server 104 provides the protected software image for download at another location. In such embodiments, it is particularly possible that the software image is retrieved from such location by the user device 101. For this purpose, the provider server may send to the user device 101 an address of the location in one of the foregoing transmission from the provider server 104 to the user device 101. In this case, the user device 101 may access the location using the address and retrieve the protected software image which is then forwarded to the secure module 105 within the user device 101. A function for retrieving for retrieving the encrypted software image may be implemented in the host software 107, and this function may also read the address included in a previous message sent from the provider server 104 to the user device 101 when such message is forwarded to the secure module 105 within the user device 101.

Upon receipt of the protected software image SIM, the secure module 105 decrypts and/or validates the software image SIM using the download key DLK. Thus, in case the software image is provided in an encrypted form, the secure module 105 decrypts the software image SIM using the download key DLK. If the software image SIM is provided with validation information, the secure module 105 validates this information using the download key DLK in order to verify the integrity of the software image SIM. As explained above, the validation information may be added to the software image SIM in addition or as an alternative to the encryption. Accordingly, the secure module 105 may perform a check of the validation information in addition or as an alternative to the encryption of the software image SIM.

Upon having successfully decrypted and/or validated the protected software image SIM, the software image SIM is installed in the user device 101 in a software installation process which is initiated by the secure module 105. Functionality for carrying out the installation process may be included in the host software 107. In such process, the host software 107 may assign a container 107a to the client software module 106 and may install the client software module 106 of the provider in such a way that it can thereafter be executed in the assigned container 108.

In case the link key is uniquely assigned to the secure module 105 of the user device 101, the embodiment described above makes it possible to use the same protection of the software image of the client software module 106 for the transmission of the software image to several user devices 101. So, the protected software image may be provided to several user devices 101, and the same download key DLK for decrypting the software image may be transmitted to such user devices 101 upon having installed an individual link key LK in the secure modules 105 of these user devices 101.

However, in an alternative embodiment, the additional transmission of the download key DLK is dispensed with. In this embodiment (not illustrated in the figures), the software image SIM of the client software module 106 is protected in such a way that it can be decrypted and/or validated in the secure module 105 of the user device 101 using the previously installed link key LK. The protected software image can be sent to the user device 101 or retrieved by the user device in the same way as in the embodiment described above. Upon receipt of the protected software image, the secure module 105 uses the link key LK to decrypt and/or validate the software image SIM. Then, the software image is installed in the user device 101 in the way described above. In this embodiment, the same link key may be used for several user devices 101 so that the software images sent to these user devices 101 can be protected in the same way.

Upon installation of the client software module 106 in the user device 101, the bootstrap mode of the user device 101 may be deactivated, and the user device 101 may be operated in the normal mode of operation. In the normal mode of operation, the client software module 106 particularly communicates with the secure module 105 in order to forward to the secure module 105 control words CW for decrypting encrypted content of the provider. As already has been explained above, data transmitted from the client software module 106 to the secure module 105 is encrypted in order to ensure that the data is not read by unauthorized third parties during the transmission within the user device 101. Advantageously, the encryption is made in such a way that the data can be decrypted in the secure module 105 using installed link key LK installed in the secure module 105. This is also illustrated in FIG. 2 showing an exemplary step 205 for forwarding the encrypted control word CW from the client software module 106 to the secure module 105.

So, the secure module 105 maintains the slot assigned to the provider in the normal mode of operation after the installation of the client software module 106 has been completed. Moreover, a link key LK stored in the secure module 105 is also used in the normal mode of operation. In this mode of operation, the secure module 105 accesses the slot and the link key LK stored therein in order to decrypt data received from the client software module 106 including the control word for decrypting the provider's content.

The link key used for decrypting data received from the client software module 106 may be identical to the link key LK that has previously been used for decrypting the software image of the client software module. In this case, the secure module 105 maintains the link key LK in the slot assigned to the provider, and continues to use the link key LK in the normal mode of operation for decrypting data received from the client software module 106. However, it is also possible for a provider to install a new link key LK in the secure module 105. For this purpose, the provider server 104 sends a further link key message to the secure module 105, and upon decrypting and authenticating the included link key LK in the way described above, the secure module 105 replaces the previously stored link key LK with the newly received link key LK. In such a way, the provider may particularly change the link key LK in response to the installation of the client software module 106 in the user device 101. Thus, the link key LK used in the mode of operation differs from the link key LK which is used in the bootstrap mode in connection with the installation of the client software module 106. In addition or as an alternative, the provider may change the link key LK at any later point in time so that the secure module 105 uses another link key LK for decrypting data received from the client software module 106 after the change. Such a change may particularly be made when the link key LK has been uncovered by unauthorized third parties or when the provider suspects that this may have happened. Likewise, the link key may be changed in regular intervals in order to improve security.

As explained above, the control word for decrypting the provider's content is sent from the provider server 104 to the user device 101 via one of the aforementioned transmission channels in a protected, particularly encrypted, form. Within the user device 101, the control word is received in the client software module 106 which forwards the control word to the secure module 105. In one embodiment, the provider server 104 may already encrypt the control word in such a way that it can later be decrypted in the secure module 105 using the link key LK. Thus, the client software module forwards the encrypted control word without encrypting it. In case the link key is uniquely assigned to the user device 101, this requires that the provider server 104 individually encrypts the control words for the user devices 101 which are authorized to access the provider's content. In a further embodiment, the provider server 104 encrypts the control word independently from the link key in such a way that it can be decrypted in the client software module 106. Upon receipt of the encrypted control word, the client software module 106 decrypts the control word using a decryption key included in the client software module 106. Upon having decrypted the control word using the decryption key, the client software module encrypts the control word again in such a way that it can be decrypted using the link key. For this purpose, the encryption key pertaining to the link key is provided to the client software module 106.

When the client software module 106 encrypts the control word before it is transmitted to the secure module, the client software module disposes of the encryption key pertaining to the link key. For this purpose, the client software module 106 may already be provided with the encryption key in the provider server 104 before it is transmitted to the user device 101 and installed therein. Preferably, the client software module 106 may be provided with the encryption key after having been installed in the user device 101. For this purpose, the provider server 104 may transmit a protected message including the link key to the client software module 106, when the user device 101 is operating in the normal operation mode upon receipt of the message, the client software module 106 may read the link key from the message and may store the link key in a secure way. This implementation has the advantage that the provider server 104 does not need to adapt the software image of the client software module 106 to the specific user device, if the link key is uniquely assigned to the user device 101.

As explained above, the provider can also change the link key LK stored for the provider within the secure module 105. At the same time, the provider preferably also changes the encryption key assigned to the link key LK in the client software module 106 so that the client software module 106 can use the encryption key pertaining to the new link key LK in order to encrypt data to be sent to the secure module 105 after the change of the link key LK in the secure module 105.

As the control word is encrypted in such a way that it can be decrypted using the link key LK, the same mechanism can be used for providing the software image SIM of the client's software module 106 to the secure module 105 and to provide the control word(s) to the secure module 105. Thus, it is not necessary to implement in the secure module 105 different mechanisms for receiving and decrypting and/or validating software images and for receiving and decrypting control words. This reduces the complexity of the secure module 105. At the same time, the security of the secure module 105 can be increased, because an increasing complexity usually affects the security of the secure module 105.

In the way described above, client software modules for different content providers may be securely installed in the user device 101, where a slot of the secure module 105 is reserved for each provider. The slot particularly stores the public key of the provider and further keys which are used in the process of installing the client software module 106 of the provider and for decrypting control words for decrypting the provider's content in the normal mode of operation. Preferably, it is also possible to replace a provider with a new provider in the user device 101. This may particularly be done, when the user of the user device 101 subscribes to a new content provider and does not longer want to use services of a provider for which a client software module 106 has previously been installed in the user device 101. For this purpose, a new provider may install his public key in the slot which has previously been reserved for another provider by transmitting an initial message including the new provider's public key as described above. Upon a successful authentication of the public key and preferably also upon a confirmation of the user that data of the old provider shall be deleted, the secure module 105 may store the public key in the slot that was previously reserved to the old provider and reserves the slot for the new provider. At the same time, the secure module 105 does preferably erase all data pertaining to the old provider which is stored in the secure module 105 and does preferably also delete all other data pertaining to the provider which is stored in the user device 101, particularly the client software module 106 assigned to the old provider. Hereby, it can be ensured that the new provider cannot read any sensible data pertaining to the old provider. Moreover, it is not possible for an attacker to uncover data pertaining to a provider, if the attacker should succeed in installing a valid public key in the secure module 105.

The installation process explained above including a decryption and/or validation of the software image in the secure module 105 may be mandatory for the installation of client software modules 106 in all containers 107a provided for executing client software modules 106 in the user device 101. However, it may likewise be possible that there are further modes of operation of the user device 101 which also allow for installing client software modules 106 that have not been decrypted and/or validated in the secure module 105. In this embodiment, the provider may select whether or not client software modules 106 executed in the container 107 assigned to the provider have to be decrypted and/or validated in the secure module 105. This selection may be made by transmitting a corresponding protected instruction to the secure module 105 of the user device 101. This instruction could be sent together with the link key. If the provider selects a mode of operation, in which the client software modules 106 do not have to be decrypted and/or validated in the secure module 105, the link may only used for decrypting data received from the client software module 106, particularly for decrypting control words. Also in this case, the procedure for installing the link key LK in the secure module 105 may correspond to the procedure described above.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The invention claimed is:

1. Device for decrypting protected content and for providing the decrypted content for playback, the device comprising:
a memory;
a processor operating in a secure environment for carrying out cryptographic operations including the decryption of the protected content using decryption information, and the device being configured to install therein at least one client software module assigned to a provider of the protected content, the client software module being adapted to forward encrypted content-decryption-information for decrypting the protected content of the provider to the processor;
wherein the processor is adapted to store a public key assigned to the provider in the memory and to authenticate at least one link key provided by the content provider using the stored public key,
wherein, the processor is adapted to receive a protected software image of the client software module and to initiate the installation of the client software module in the device upon having decrypted and/or validated the protected software image by means of a link key authenticated using the stored public key or by means of a key of a key ladder derived from the authenticated link key, and
wherein, during execution of the installed client software module, the secure module processor being adapted to decrypt the encrypted content-decryption-information by means of the link key authenticated using the stored public key or by means of the key of the key ladder derived from the authenticated link key.

2. Device according to claim 1, wherein the processor is configured to store the public key only upon having successfully validated a digital certificate assigned to the public key.

3. Device according to claim 1, wherein the link key is provided with a digital signature created on the basis of a secret key assigned to the content provider, the authentication of the link key in the processor comprising verifying the digital signature using the public key stored in the memory.

4. Device according to claim 1, wherein processor is adapted to receive the link key in an encrypted form and to store the link key upon having decrypted the link key using a secret key, the secret key being securely stored in the memory.

5. Device according to claim 4, wherein the link key is encrypted using a public key assigned to the processor, the secret key and the public key assigned to the processor forming an asymmetric key pair.

6. Device according to claim 1, wherein the processor is adapted to decrypt and/or validate the software image of the client software module using a download key, the download key being provided to the processor by the provider in an encrypted form and being decrypted by the processor using the link key.

7. Device according to claim 1, wherein the processor decrypts and/or validates the software image of the client software module and decrypts the decryption information on the basis of the same link key.

8. Device according to claim 1, wherein, when being executed in the device, the client software module receives the decryption information in an encrypted form, decrypts the decryption information and forwards the decryption information to the processor upon having encrypted the decryption information again in such a way that it can be decrypted using the link key.

9. Device according to claim 1, wherein, when being executed in the device, the client software module receives the decryption information in an encrypted form, the encryption being made in such a way that the decryption information can be decrypted using the link key, and the client software module forwards the encrypted decryption information to the processor.

10. Device according to claim 1, wherein the memory comprises a plurality of slots for storing one or more cryptographic keys and/or wherein the processor carries out cryptographic operations using the stored cryptographic keys, and wherein the secure module is configured to store the pubic key in one slot.

11. Device according claim 10, wherein the processor reserves the slot for the content provider to which the public key is assigned in response to the storing of the public key in the slot.

12. Device according to claim 1, having at least one mode of operation in which the client software module can only be installed and/or executed in the device when the software image of the client software module has been decrypted and/or validated by means of a link key authenticated using the stored public key or by means of a key of a key ladder derived from the authenticated link key.

13. System comprising a device according to claim 1 and further comprising a provider server configured to transmit the public key and/or the link key to the device.

14. System according to claim 13, wherein the provider server is further configured to transmit the software image of the client software module and/or the decryption information to the device.

15. Method for operating a device for decrypting protected content and for providing the decrypted content for playback, the device comprising a processor operating in a secure environment for carrying out cryptographic operations including the decryption of the protected content using encrypted content-decryption-information, and the device being configured to install therein at least one client software module assigned to a provider of the protected content, the client software module being adapted to forward decryption information for decrypting the protected content of the provider to the processor;

wherein the method comprises the steps of:

the processor storing a public key assigned to the provider in a memory comprised in the device and authenticating at least one link key provided by the content provider using the stored public key, the processor receiving a protected software image of the client software module and initiating the installation of the client software module in the device upon having decrypted and/or validated the protected software image by means of a link key authenticated using the stored public key or by means of a key of a key ladder derived from the authenticated link key, and during execution of the installed client software module, the secure module decrypting the encrypted content-decryption-information by means of the link key authenticated using the registered stored public key or by means of the key of the key ladder derived from the authenticated link key.

* * * * *

UNITED STATES PATENT AND TRADEMARK OFFICE
CERTIFICATE OF CORRECTION

PATENT NO. : 9,722,992 B2  
APPLICATION NO. : 14/788418  
DATED : August 1, 2017  
INVENTOR(S) : Marnix Vlot et al.

Page 1 of 1

It is certified that error appears in the above-identified patent and that said Letters Patent is hereby corrected as shown below:

On the Title Page

In Abstract, page 2, Line 3:
". . . or by means of key of a key ladder . . ."
Should read:
". . . or by means of a key of a key ladder . . ."

In the Claims

Column 19, Line 18 Claim 13:
"System comprising a device according to claim 1 . . ."
Should read:
"System comprising the device according to claim 1 . . ."

Signed and Sealed this
Seventh Day of November, 2017

Joseph Matal
*Performing the Functions and Duties of the*
*Under Secretary of Commerce for Intellectual Property and*
*Director of the United States Patent and Trademark Office*